United States Patent [19]

Waara

[11] 4,032,246

[45] June 28, 1977

[54] CLAMP

[75] Inventor: William A. Waara, Detroit, Mich.

[73] Assignee: Visi-Trol Engineering Company, Detroit, Mich.

[22] Filed: May 10, 1976

[21] Appl. No.: 684,872

[52] U.S. Cl. ............................. 403/390; 403/400
[51] Int. Cl.² ........................................ F16B 7/04
[58] Field of Search .......... 403/389, 390, 391, 394, 403/396, 398, 399, 400

[56] References Cited

UNITED STATES PATENTS

| 792,065 | 6/1905 | Myers | 403/394 X |
|---|---|---|---|
| 964,140 | 7/1910 | Zahniser | 403/390 X |
| 1,986,028 | 1/1935 | Terry | 403/391 X |
| 2,655,088 | 10/1953 | Charley | 403/400 X |
| 2,894,773 | 7/1959 | Noe | 403/400 X |
| 3,819,290 | 6/1974 | Plotkin | 403/400 X |

FOREIGN PATENTS OR APPLICATIONS

| 1,322,771 | 7/1973 | United Kingdom | 403/400 |

Primary Examiner—Andrew V. Kundrat
Attorney, Agent, or Firm—Gifford, Chandler, Sheridan & Sprinkle

[57] ABSTRACT

An improved clamp is provided for clamping a pair of crossing elongated members together wherein the members cross each other at a predetermined angle. The clamp comprises a base which is disposed between the elongated members at their intersection and includes a channel formed on each side of the base for receiving the elongated members therein. The free ends of a U-bolt are disposed through registering apertures in the base so that one of the elongated members is entrapped in one of the channels and between the U-bolt and the base. A bar having apertures which register with the free ends of the U-bolt is placed over the free ends so that the other elongated member is entrapped in the other channel between the bar and the base. Nut members threadably engage the free ends of the U-bolt to secure the bar to the U-bolt and to thereby clamp the elongated members together at a predetermined angle.

3 Claims, 4 Drawing Figures

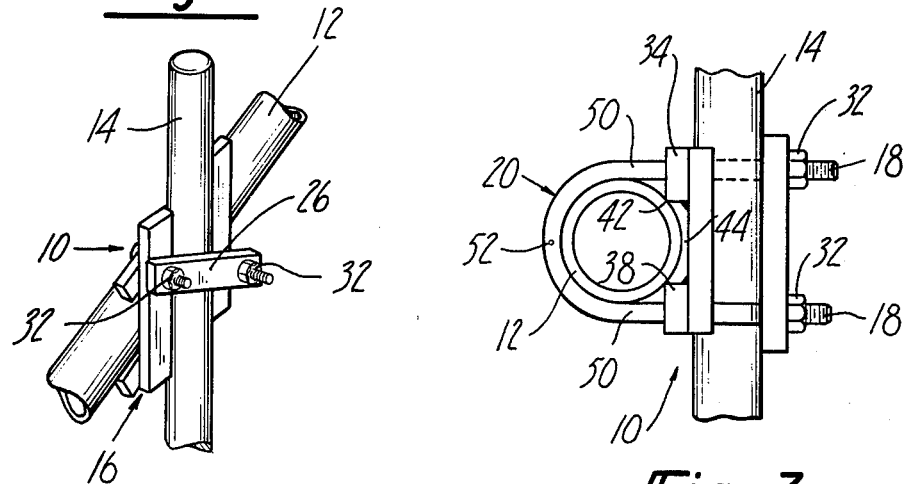
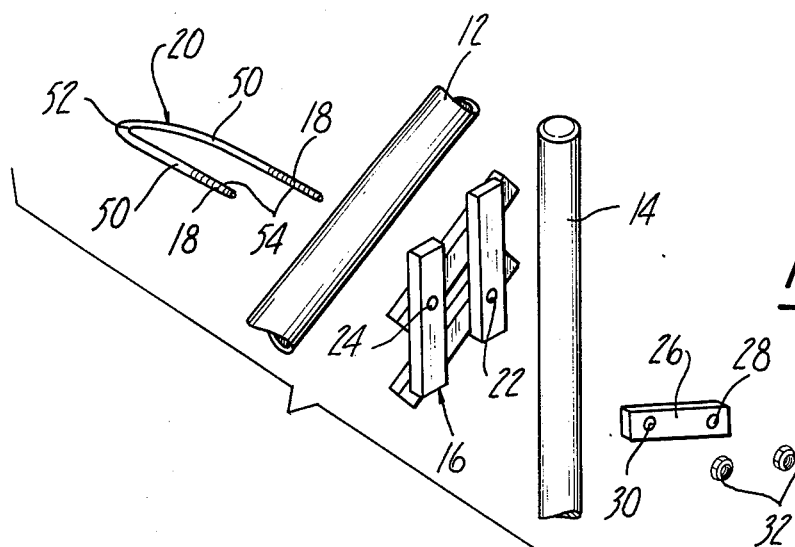
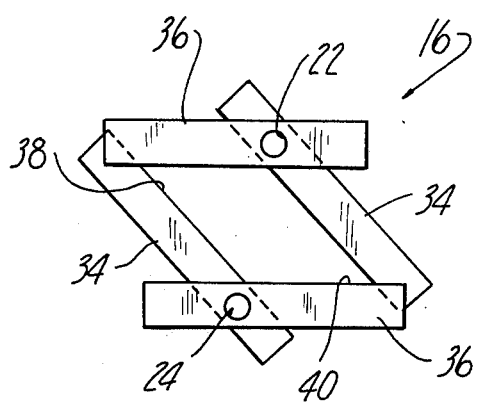

CLAMP

BACKGROUND OF THE INVENTION

I. Field of the Invention

The present invention relates generally to clamps and, more particularly, to a clamp adapted to secure crossing elongated members to each other at a predetermined angle.

II. Description of the Prior Art

There have been many clamps which are particularly adapted for securing crossing elongated members, such as pipes, to each other. These previously known clamps, however, suffer several disadvantages unknown to the present invention.

One disadvantage of the previously known clamps is that the clamps are unduly complex in construction which accordingly increases the cost of the clamp. Since a large number of clamps are typically required for most conventional constructions, such as buildings, the high cost of the clamps represents a significant portion of the total cost of the construction.

Another disadvantage of the previously known clamps is that such clamps are designed to secure crossing elongated members together only at right angles to each other. Consequently, these previously known clamps have proven inadequate for securing elongated members together which cross at an oblique angle relative to each other. Moreover, these previously known clamps are not easily adaptable for securing together elongated members which cross each other obliquely.

SUMMARY OF THE PRESENT INVENTION

The present invention provides a clamp for clamping together two elongated members crossing each other at any angle, including oblique angles, and which is of simple and inexpensive construction.

In brief, the clamp of the present invention comprises a base disposed between the elongated members at their point of intersection. The base includes a channel formed on each side so that each channel is adapted to receive one of the elongated members therein. The angle of the channels with respect to each other defines the angle of intersection of the elongated members.

The free ends of a fastener, such as a U-bolt, or the like, are disposed through apertures in the base so that one of the elongated membes is entrapped in one of the channels and between the base and the fastener. A bar having apertures is disposed over the free ends of the fastener so that the other elongated member is entrapped on the opposite side of the bar in the other channel and between the base and the bar. Nut members threadably engage the free ends of the U-bolt to secure the elongated members rigidly to the base and accordingly to each other.

As will become hereinafter apparent, the construction of the base is such that the channels on each side of the plate member may be constructed at any desired angle relative to each other.

BRIEF DESCRIPTION OF THE DRAWING

A better understanding of the present invention will be had upon reference to the following detailed description when read in conjunction with the accompanying drawing wherein like reference characters refer to like parts throughout the several views, and in which:

FIG. 1 is a perspective view showing the clamp of the present invention securing two crossing elongated members together;

FIG. 2 is an exploded perspective view of the clamp of the present invention;

FIG. 3 is a plan view of the present invention taken substantially along line 2—2 in FIG. 1; and FIG. 4 is a top plan view showing the base for the clamp of the present invention.

DETAILED DESCRIPTION OF THE PRESENT INVENTION

With references to FIGS 1 and 2, a clamp 10 according to the present invention is thereshown securing a pair of crossing elongated members, such as pipes 12 and 14, to each other.

The pipes 12 and 14 cross each other at any desired angle relative to each other as will become shortly apparent.

The clamp 10 further comprises a base 16 disposed between the pipes 12 and 14 at their point of intersection. A fastener 20, such as a U-bolt, having parallel legs 50 and a cross leg 52 joining the parallel legs 50 at one end is provided and preferably the free ends 18 of the legs 50 are threaded as shown at 54. The free ends 18 of the parallel legs 50 extend through apertures 22 and 24 in the base 16 so that the pipe 12 is entrapped between the base 16 and the cross leg 52 of the fastener 20. A bar 26 having apertures 28 and 30 is placed over the free ends 18 of the fastener 20 so that the free ends 18 extend through the apertures 28 and 30. Nut members 32 threadably engage the free ends 18 of the parallel legs 50 thus entrapping the other pipe 14 between the bar 26 and the base 16.

The base 16, as more clearly shown in FIGS. 3 and 4, comprises a first pair of spaced and parallel bar members 34 which are disposed at a predetermined angle relative to a second pair of spaced and parallel bar members 36. The first and second bar members 34 and 36 are arranged relative to each other so that each of the first bar members 34 overlaps at least a portion of each of the second bar members 36. The bar members 34 and 36 are secured to each other by any conventional means, such as welding, at the overlapping portion of the bars 34 and 36. In this manner, the base 16 may be easily constructed with any desired angle between the first pair and the second pair of bar members 34 and 36. The angle between the bar members will, of course, define the angle between the elongated members 12 and 14 and thus the clamp can be readily constructed to produce any desired angle.

Still referring to FIGS. 3 and 4, the first bar members 34 are preferably rectangular in cross section so that they form an elongated channel 38, rectangular in cross section, on one side of the base 16. Likewise, the second bar members 36, which are also rectangular in cross section, form an elongated channel 40 on the other side of the base 16. It should be apparent that the channels 38 and 40 are disposed at the same angle relative to each other as are the bar members 34 and 36.

The first and second bar members 34 and 36 together form a parallelogram and the apertures 22 and 24 are formed through the bars 34 and 36 at diagonally opposed corners of the parallelogram. Consequently, the aperture 22 is on one side of both of the channels 38 and 40 while the other aperture 24 is on the other side of both channels 38 and 40.

With reference particularly to FIG. 3, the width of the channel 38 is preferably less than the diameter of the pipe 12 so that the upper and inner edges 42 of the bar members 34 abut against the pipe 12 and maintain a small gap 44 between the base of the channel 38 and the pipe 12. The same is also true for the pipe 14 in the channel 40. Thus, as the nut members 32 are tightened onto the free ends 18 of the fastener 20 the edges 42 of the bar members 34 bite into the pipe 12 thereby firmly securing the pipe 12 to the base 16. Simultaneously, the corresponding edges of the bar members 36 bite into and rigidly secure the pipe 14 to the base 16.

From the foregoing it can be seen that th clamp 10 provides a simple and relatively inexpensive means for securing two crossing elongated members, such as the pipes 12 and 14, at any desired angle relative to each other. To do so, the bar members 34 and 36 are simply arranged in the desired angular relationship and are thereafter secured to each other. Consequently, expensive retooling to construct the clamp 10 is totally avoided.

Having described my invention, many modifications thereto will become apparent to those skilled in the art to which it pertains without deviation from the spirit of the invention as defined by the scope of the appended claims.

What is claimed is:

1. For use in combination with a pair of elongated cylindrical members crossing each other at a predetermined angle, a clamp for clamping said members together at their point of intersection, said clamp comprising:

a base disposed between the elongated members at their point of intersection, said base having a first pair of spaced and parallel bar members having a rectangular cross-sectional shape, and a second pair of spaced and parallel bar members having a rectangular cross-sectional shape, said second bar members disposed at said predetermined angle relative to the first pair of spaced and parallel bar members so that a portion of each of said second bar members overlaps and is secured to each of said first bar members, said first and second bar members of said base forming a channel on each side of said base, wherein each of said channels is adapted to receive one of said elongated members therein and wherein the spacing between the pairs of bar members is less than the diameter of the corresponding received cylindrical member, a fastener having a pair of space and parallel first legs and a second leg disposed across one end of said first legs, said first legs of said fastener being disposed through receiving apertures in said base so that one of said elongated members is entrapped between the second leg of said fastener and said base, a bar having apertures for receiving the first legs of said bolt member therethrough so that the other elongated member is entrapped between said bar and said base, and means for securing the first legs of the fastener to said bar.

2. The invention as defined in claim 1, wherein said fastener is a U-bolt.

3. The invention as defined in claim 1, wherein said receiving apertures in said base are formed through diagonally opposed overlapping portions of said first and second bar members.

* * * * *